(12) United States Patent
Faulkner (10) Patent No.: US 6,606,484 B1
(45) Date of Patent: Aug. 12, 2003

(54) DISTORTION CORRECTION CIRCUIT FOR DIRECT CONVERSION RECEIVER

(75) Inventor: Michael Faulkner, Moonee Ponds (AU)

(73) Assignee: Telefonaktiebolaget LM Ericsson (publ.), Stockholm (SE)

( * ) Notice: Subject to any disclaimer, the term of this patent is extended or adjusted under 35 U.S.C. 154(b) by 0 days.

(21) Appl. No.: 09/647,275

(22) PCT Filed: Mar. 29, 1999

(86) PCT No.: PCT/AU99/00226
§ 371 (c)(1),
(2), (4) Date: Dec. 4, 2000

(87) PCT Pub. No.: WO99/50966
PCT Pub. Date: Oct. 7, 1999

(30) Foreign Application Priority Data

Mar. 27, 1998 (AU) ............................................. PP2618

(51) Int. Cl.[7] .................................................. H04B 1/04
(52) U.S. Cl. ........................ 455/131; 455/324; 455/313; 455/67.1
(58) Field of Search ........................ 455/131, 133–147, 455/313, 318, 67.1, 67.3, 63, 324, 226.1

(56) References Cited

U.S. PATENT DOCUMENTS

| 5,230,099 | A | * | 7/1993 | Loper | ......................... 455/324 |
|---|---|---|---|---|---|
| 5,604,929 | A | * | 2/1997 | Loper et al. | ................. 455/324 |
| 5,898,912 | A | * | 4/1999 | Heck et al. | ............... 455/226.1 |
| 6,370,205 | B1 | * | 4/2002 | Lindoff et al. | ............... 375/318 |
| 6,459,889 | B1 | * | 10/2002 | Ruelke | ........................ 455/324 |
| 6,516,187 | B1 | * | 2/2003 | Williams et al. | ............. 455/313 |

* cited by examiner

Primary Examiner—Quochien Vuong
Assistant Examiner—Lana Le
(74) Attorney, Agent, or Firm—Coats & Bennett, P.L.L.C.

(57) ABSTRACT

A distortion correction circuit for a direct conversion receiver, the direct conversion receiver comprising a local oscillator for generating a local oscillator signal, a mixer for multiplying a radio frequency signal, and a local oscillator signal together and supplying the resultant mixer output signal to a demodulated signal, the demodulated signal path including a first low-pass filter for selecting a baseband signal at a first filter output terminal, wherein the offset correction circuit includes a squaring circuit for squaring the mixer output signal and supplying the resultant distortion estimate signal to a distortion estimate signal path, signal subtraction means for subtracting the resultant output signal at a subtraction point in the distortion estimate signal path, and adaptive processing means for equalising the transfer function of the distortion signal estimate path and the transfer function of the demodulated signal path between the mixer output and the subtraction point.

11 Claims, 7 Drawing Sheets

DISTORTION CORRECTION CIRCUIT FOR DIRECT CONVERSION RECEIVER

FIELD OF THE INVENTION

The present invention relates to direct conversion, such as homodyne receivers, and in particular to circuitry for the correction of DC offset and second order intermodulation distortion in such receivers.

BACKGROUND OF THE INVENTION

One of the major problems affecting direct conversion receivers is the presence of DC offsets in the base band in-phase and quadrature output lines. It is difficult to remove because most digital modulations have a DC component, which must be preserved. DC offsets are caused by local oscillator leakage back into the antenna port of the terminal and by circuit imbalances. AC coupling can be used to block DC offsets, but such coupling reduces the effectiveness of the demodulation because of the additional group delay applied to the signal. AC coupling can be used with low intermediate frequency (IF) conversion, where the down-converted channel has a normally small frequency offset so that no received components of the desired channel have a DC component, but these schemes have difficulty in obtaining adjacent channel selectivity.

Signal leakage from the radio frequency input to the local oscillator port, and circuit imbalance combined with non-linearity within the mixer and/or other components of the circuit (for example, amplifiers and filters), cause a second and more damaging form of DC offset. Both effects cause the radio frequency signal to mix with itself and generate a DC component that varies with the square of the amplitude of the input signal. This form of DC offset is a result of second order intermodulation distortion within the mixer and/or other components. Recovery of the demodulated base band signal by the direct conversion receiver can therefore be jammed by any large off-channel interfering signal, irrespective of its frequency. In TDMA systems this distortion causes the DC offset to pulsate with the transmission bursts of a strong nearby transmission. For transmissions employing non-constant envelope modulations, additional offset modulations will occur, these offset modulations can often have spectral components with bandwidths exceeding one channel bandwidth, and are therefore capable of causing interference to systems operating in the low IF mode. Unlike third order intermodulation effects, where the interfering signals must have a certain predefined frequency relationship before significant distortion is experienced second order intermodulation distortion can be found to be present in direct conversion receivers whenever large signals exist.

SUMMARY OF THE INVENTION

There currently exists a deed to effectively correct distortion introduced into direct conversion receivers by DC offset and second order intermodulation.

With this in mind, the present invention provides an distortion correction circuit for a direct conversion receiver, the direct conversion receiver comprising a local oscillator for generating a local oscillator signal, a mixer for multiplying a radio frequency signal, and a local oscillator signal together and supplying the resultant mixer output signal to a demodulated signal path, the demodulated signal path including a first low-pass filter for selecting a baseband signal at a first filter output terminal, wherein the offset correction circuit includes a squaring circuit for squaring the mixer output signal and supplying the resultant distortion estimate signal to a distortion estimate signal path, signal subtraction means for subtracting the distortion estimate signal at a subtraction point in the distortion estimate signal path, and adaptive processing means for equalising the transfer function of the distortion signal estimate path and the transfer function of the demodulated signal path between the mixer output and the subtraction point.

If the direct conversion receiver uses a quadrature demodulator then the distortion correcting circuit can be applied to each of the in-phase and quadrature arms.

In one embodiment of the invention, the signal subtraction point is between the mixer and the first low-pass filter.

In another embodiment, the distortion estimate signal path further comprises a second low-pass filter and the signal subtraction point is at the first filter output terminal.

Conveniently, the subtraction of the distortion estimate signal at the subtraction point generates an error signal, the adaptive processing means acting to equalise said transfer function by minimising the error signal.

The adaptive processing means may be an n-tap adaptive linear combiner.

The n-tap adaptive linear combiner preferably implements a least mean squared error algorithm.

The adaptive processing means may be implemented by digital signal processing.

The distortion correction circuit may further provide delay means for introducing a delay into the demodulated signal path, prior to the subtraction point The adaptive linear combiner may include at least a first weight update coefficient for adjusting the weights of a plurality of said taps.

The adaptive linear combiner may include a DC tap to minimise a DC offset in the demodulated signal path.

The adaptive linear combiner may further include in this case, a second weight update coefficient for separately adjusting the weight of the DC tap.

BRIEF DESCRIPTION OF THE DRAWINGS

The following description refers in more detail to the various features of the distortion correction circuit of the present invention. To facilitate an understanding of the invention, reference is made in the description to the accompanying drawings where the distortion correction circuit is illustrated in a preferred embodiment. It is to be understood that the distortion correction circuit of the present invention is not limited to the preferred embodiment as illustrated in the drawings.

In the drawings.

DESCRIPTION OF THE PREFERRED EMBODIMENTS

Figure 1:
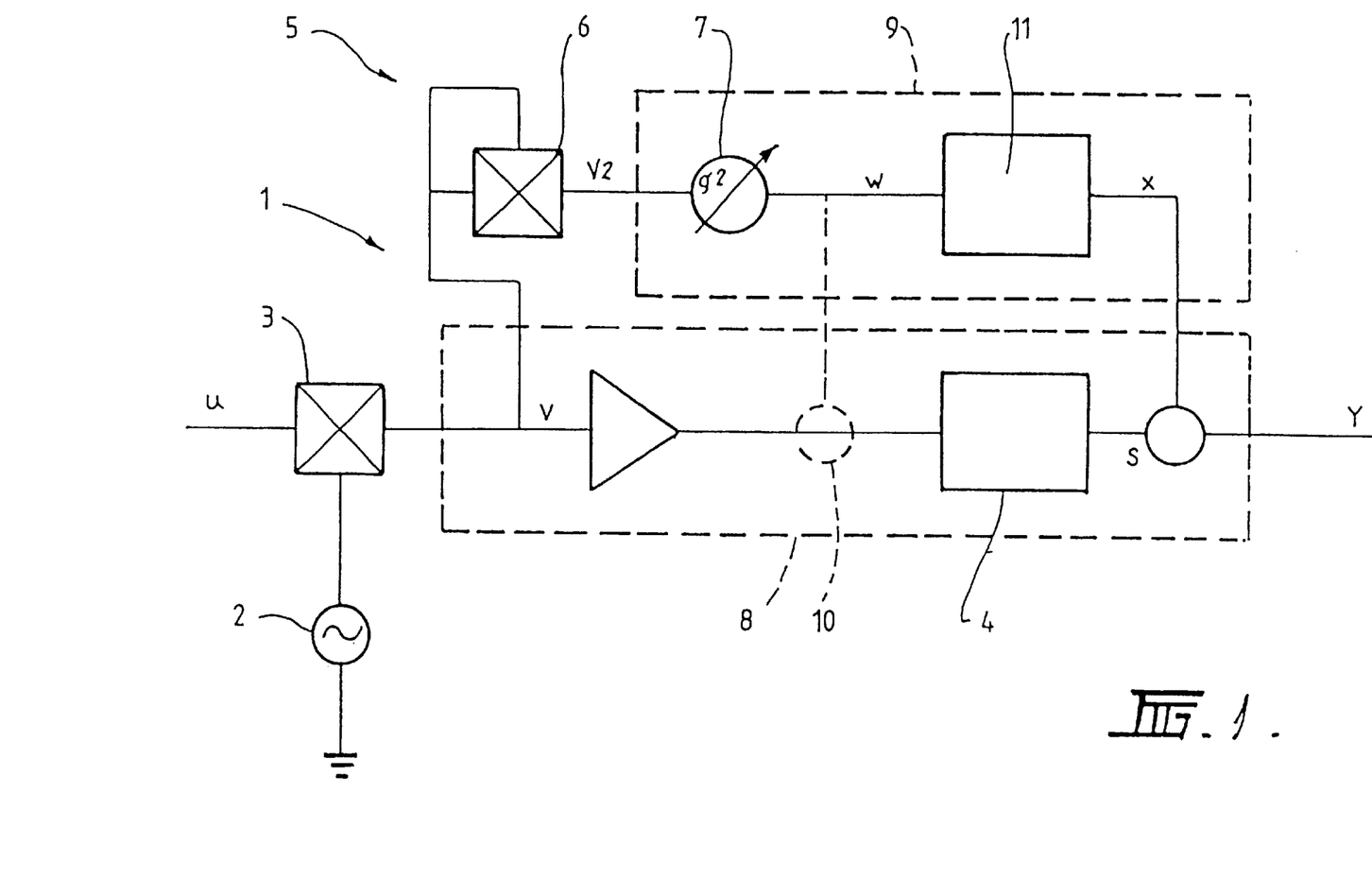
FIG. 1 is a schematic diagram of a first embodiment of a direct conversion receiver including a distortion correction circuit according to the present invention.

Turning now to FIG. 1, there is shown generally a direct conversion receiver 1 comprising a local oscillator 2 and mixer 3 followed by a low-pass filter 4. The direct conversion receiver is adapted to receive a modulated radio-frequency carrier signal at a first of the mixers input terminals. The local oscillator signal generated by the local oscillator 2 is applied to the other of the mixer input terminals. The mixer 2 multiplies the modulated radio-frequency carrier signal and the local oscillator signal together and provides the resultant multiplied signal v at the mixer output terminal. The low-pass filter 4 has its input connected to the output of the mixer 3. Multiplication of the local oscillator signal together with the modulated radio-frequency carrier signal leads to a frequency shift of the carrier signal, generating a signal component whose frequency is the sum of the local oscillator signal frequency and the carrier frequency, and a signal component whose frequency is the difference between the local oscillator signal frequency and the carrier frequency. In homodyne receivers, the local oscillator frequency and the carrier frequency are substantially identical, so that the "difference" signal component effectively removes the modulation from the carrier signal. The "difference" signal is the recovered baseband signal of the desired channel. The low-pass filter 4 acts to accept the desired channel at baseband and to reject the "sum" signal component, and reject other adjacent and nearby channels that have been down-converted in the mixing process. In so doing, the low-pass filter 4 fulfills some of the channel selectivity requirements of the direct conversion receiver.

Any in-band distortion product or change in DC level can result in distortion in the recovered base band signal. All frequency translated interfering signals are present prior to the low-pass filter 4. These interfering signals include those very large signals that cause the distortion, and in particular, the second order intermodulation interference in this case. The envelope and modulation of these very large signals is preserved through the down-conversion carried out by the mixer 3.

In order to minimise this distortion, a distortion correction circuit 5 is provided. The offset correction circuit generates a correction signal w or x, by passing the pre-filtered signal v through a non-linear circuit that substantially reproduces the dominant distortion characteristic. In order to generate an estimation of the second order intermodulation distortion, a squaring circuit 6 for squaring the mixer output signal is used. The output of the squaring circuit is then fed forward through an appropriate gain scaling means 7, prior to subtraction from the demodulated signal path in order to cancel the effect of the unwanted interference.

The output v from the mixer 3 is supplied to a demodulated signal path 8, which includes the low-pass filter 4 for eliminating unwanted out-of-band signals from the mixer output signal v. Similarly, the squarer output signal $v^1$ is supplied to a distortion estimate signal path 9.

In a first embodiment of the invention, the distortion estimate signal w is subtracted from the demodulated signal path 8 at a point between the mixer 3 and the first low-pass filter 4. In this example, subtraction means 10 subtract the distortion estimate signal w from the mixer output signal v prior to the input of the low-pass filter 4. This configuration advantageously enables the low-pass filter 4 to perform both tasks of channel selectivity and the removal of unwanted out-of-band products from the squaring process in the distortion estimate signal w.

However, many homodyne designs put filtering directly after the mixer, in which case the distortion estimate signal can be fed forward and subtracted from the demodulated base band signal after the low-pass filter 4. In this case, a second low-pass filter 11 may be included in the distortion estimate signal path 9 in order to, remove unwanted products and harmonics from the distortion estimate signal, w, and to introduce the transfer function of the first low-pass filter 4 into a distortion estimate signal path, 9.

Since the gain, frequency response and distortion characteristics of the direct conversion receiver can change with temperature and from circuit to circuit, it may be preferable for the gain scaling means and the low-pass filter 11 to be adaptively adjusted during operation of the direct conversion receiver. Accordingly, the gain scaling means 7 and/or adjustment of the low-pass filter 11 may be realised by adaptive processing means which act to equalise the transfer function of the distortion estimate signal path 9 and the transfer function of the demodulated signal path 8 between the output of the mixer 3 and the point at which the distortion estimate signal is subtracted from the demodulated base band signal. It should be noted that in TDMA systems, mismatch between the two filters may result in short duration splashes on the rise and fall times of bursts caused by the interfering signal due to delay and rise time mismatch in the distortion estimate signal path. The following is an analysis of the operation of the offset correction circuit 5.

The input signal to the direct conversion receiver 1 consists of a radio frequency modulated baseband signal m (t)cos($\omega_c$t) and a jamming signal a(t)cos(($\omega_c+\omega_0$)t) at some frequency offset, $\omega_0$. The spectrum of a(t) does not overlap that of m(t). Normally a(t) would be one of the neighbouring channels or any other strong signal that gets through the receiver front-end selectivity circuits. Accordingly, the input signal u is represented by the equation:

$$u(t) = Re\{m(t)e^{j\omega_c t} + a(t)e^{j(\omega_c+\omega_0)t}\}$$

After passing through the mixer 3 it is multiplied by the signal, r(t), at the local oscillator (LO) port, which consists of a cosine wave plus some of the input signal u(t) that has leaked into the LO path. The leakage path has a gain $k_2 \ll 1$ and is one possible cause of the second order intermodulation (IM2) distortion. The signal r is therefore given by:

$$r(t) = Re\{e^{j\omega_c t}\} + k_2 u(t)$$

The signal at the output of the mixer 3 v(t) thus becomes:

$$v(t) = 0.5(Re\{m(t)\} + Re\{a(t)e^{j\omega_0 t}\}) + 0.25k_2(|m(t)|^2 + |a(t)|^2 + 2Re\{m(t)^*a(t)e^{j\omega_0 t}\})$$

where terms with frequencies higher than $\omega c$ are assumed to be filtered out. The first term is the desired signal from the mixer, the second term is the interfering signal on a carrier frequency of $\omega_0$ and normally removed by subsequent filtering by the low-pass filter 4. The third and fourth terms are baseband signals with a bandwidth up to twice that of m(t); they are therefore a potential source of jamming. The final term shows the cross-modulation between the desired and interfering signals and at the same frequency of term two.

Jamming occurs when m(t) is small and a(t) is large such that the second order intermodulation jamming signal, which is dominated by $(0.5\ k_2|a(t)|^2)$, is of a similar amplitude to the demodulated baseband signal $(Re\{m(t)\})$. The jamming effect increases with the square of the interfering signal's amplitude.

Cancellation of the jamming signal is possible because the dominant signal in v(t) is the second term. The dominant output of the squaring circuit is therefore:

$$v(t)^2 = 0.25(|a(t)|^2 + Re\{a(t)^2 e^{j2\omega_0 t}\})$$

In embodiments of the invention where the distortion estimate signal is subtracted after filtering by the low-pass filter 4, the second term at twice the offset frequency can be removed by filtering by the second low-pass filter 11, leaving the first term, which can be fed-forward and scaled by $g_2$ to cancel the jamming signal. Accordingly, x is given by the relation:

$$x(t) = 0.25 g_2 |a(t)^2|$$

The output of the low-pass filter 4, after subtracting the signal x, is accordingly:

$$y(t) = s(t) - x(t)$$

$$y(t) = 0.5 Re\{m(t)\} + 0.25 k_2 (|m(t)|^2 + |a(t)|^2) - 0.25 g_2 |a(t)|^2 = 0.5 Re\{m(t)\}$$

when $g_2$ is adjusted to equal $k_2$ and because $k_2 m(t)^2$ is so small compared to the other terms.

The coefficient g2 of the gain scaling means 7 may be realised by adaptive processing means which may be performed using digital signal processing.
The signal used to change these weights is devised from the mean squared error between the distortion estimate signal and the demodulated baseband signal. These weights are adjusted to minimise this error.

Figure 2:
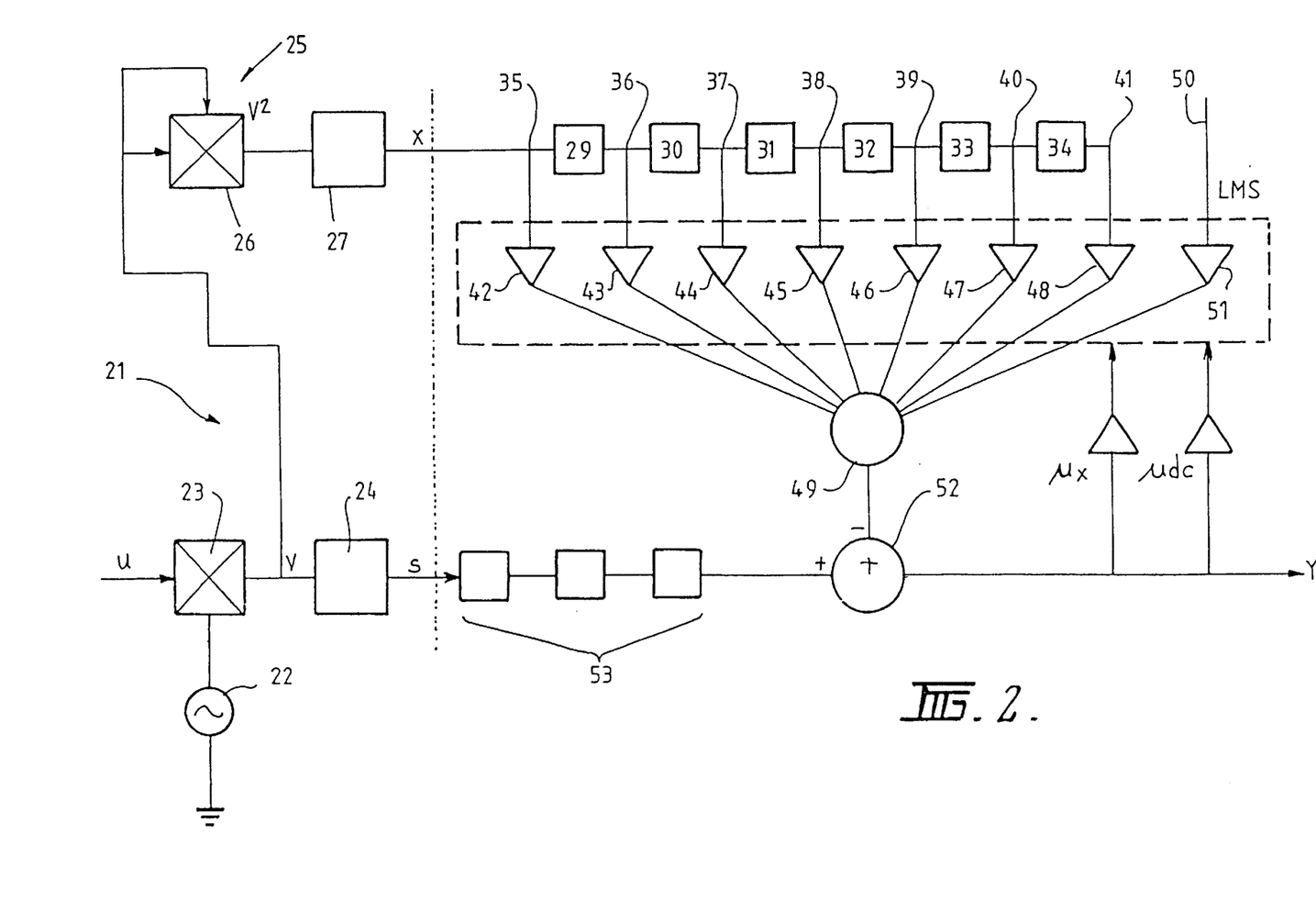
FIG. 2 is a schematic diagram of a second embodiment of a direct conversion receiver including a distortion correction circuit according to the present invention.

FIG. 2 shows one embodiment of such an arrangement. In this figure, there is shown a direct conversion receiver 21 having a local oscillator 22, mixer 23 and low-pass filter 24, operably identically to the circuit shown in FIG. 1. A distortion correction circuit 25 is shown which includes a squaring circuit 26 connecting to the output of the mixer 23. A low-pass filter 27 is connected to the output of the mixer 26.

The coefficient g2 of the gain scaling means 7 can be adjusted using correlation techniques. The distortion estimate signal at the output of the low-pass filter 27 should be uncorrelated with the demodulated baseband signal, with distortion estimate subtracted, when adjustment is perfect. The residue correlation can be used to adjust the coefficient g2 and equalise the transfer functions of the distortion estimate signal path and the demodulated signal path between the mixer output and the subtraction point by noting that the mean squared value of the output signal y of the direct conversion receiver is minimised when cancellation is perfect. A number of adjustment procedures are possible for this type of problem, including least squares, RLS and LMS algorithms. However, if there is a DC offset in the distortion estimate signal path, and there is DC present on the mixer output signal (caused by local oscillator leakage into the radio frequency input port), the correlation can give a false output. Optimum adjustment of g2 to minimise second order intermodulation distortion is unlikely to correspond to the optimum adjustment to remove the DC component. A minimum mean square algorithm has been found to produce a compromise solution and to allow some DC and some second order intermodulation distortion to remain on the output signal, y, of the direct conversion receiver. A separate DC cancellation coefficient is required if both DC and second order intermodulation distortion are to be cancelled. Other methods of correcting the DC offset are possible.

The adaptive processing means 28 represented in FIG. 2 is realised by an adaptive linear combiner using an LMS algorithm. The adaptive linear combiner 28 comprises, in this illustrative example, six delay elements 29 to 34 connected in series to the output of the low-pass filter. Seven separate input sample values 35 to 41 are tapped off the adaptive linear combiner, the gain or weight of the.signal in each tap being determined by the coefficients 42 to 48. The signals tapped are summed by an adder 49. The adaptive linear combiner 28 also includes a DC tap 50 to minimise any DC offset in the modulated signal path, and a coefficient or weight 51 adjusting the gain of the DC tap signal. The signal from the DC tap 50 is also summed with the other tap signals by the adder 49. Two equaliser update coefficients $\mu_x$ and $\mu_{dc}$ are provided for applying small adjustments respectively to the weights 42 to 48 and the DC weight 51. The step size of the update coefficients determine the convergence rate of the adaptive linear combiner, as well as on its stability and accuracy.

The distortion estimate signal produced at the output of the adder 49 is subtracted from the demodulated baseband signal at the output of the low-pass filter 24 by a subtraction circuit 52.

Delay means 53 may be introduced into the demodulated signal path, prior to the subtraction point of the distortion estimate signal, in order to synchronise the distortion estimate signal and the demodulated baseband signal during subtraction. Conveniently, the delay introduced into the demodulated signal path may be approximately equal to half the delay introduced into the distortion estimate signal path by the equaliser 28, or in other words, introduce approximately half the number of delay elements into the demodulated signal path as there are in the equaliser 28.

Figure 3:
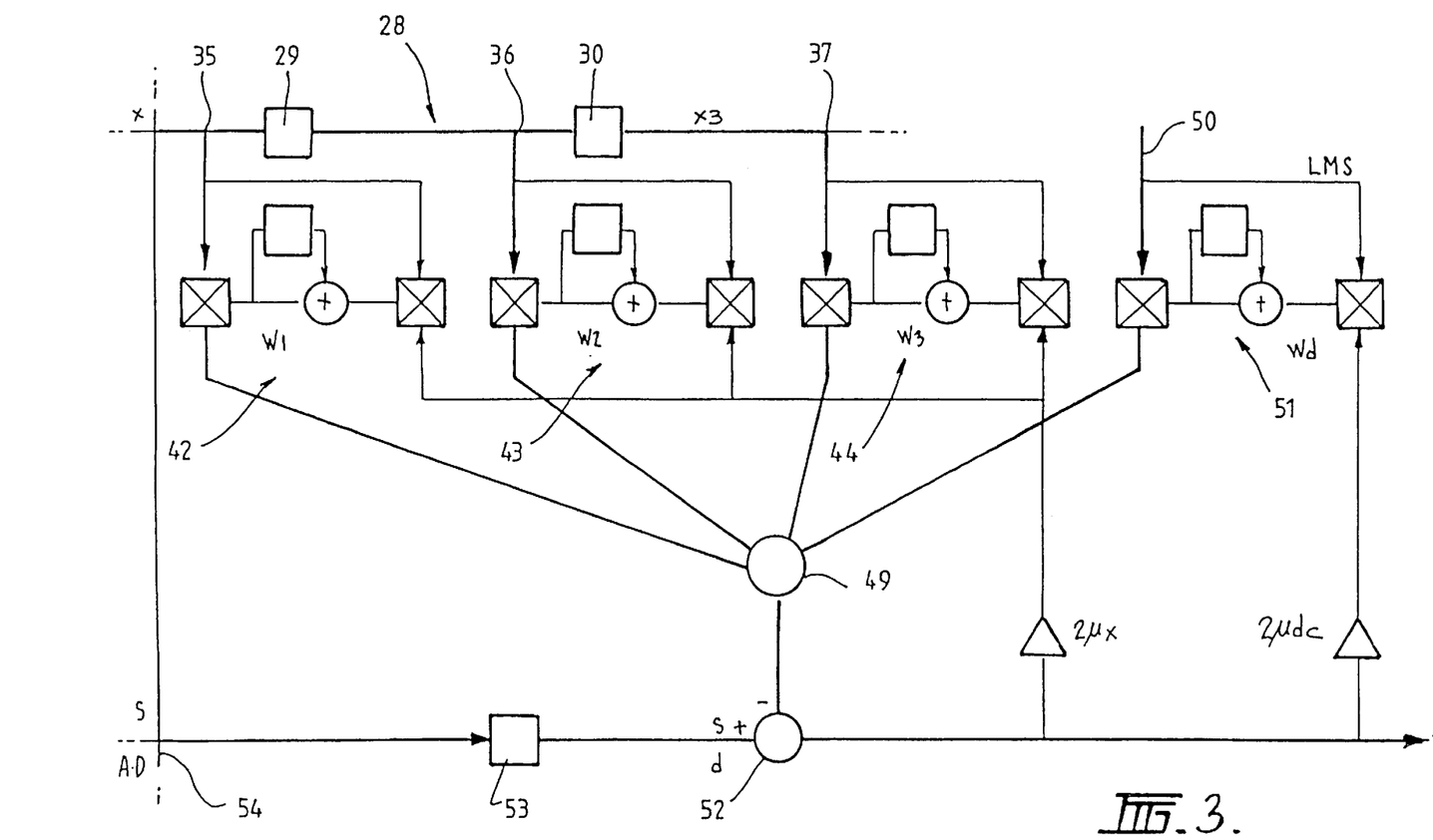
FIG. 3 is a detailed view of an n-tap adaptive linear combiner of the distortion correction circuit shown in FIG. 2.

FIG. 3 provides a more detailed representation of the equaliser 28 shown in FIG. 2. The distortion estimate signal x from the output of the low-pass filter 27 should ideally have its amplitude and phase aligned with the distortion in the demodulated baseband signal, s, for good cancellation. The n-tap equaliser 28 effectively combines the functions of the gain scaling circuit 7 shown in FIG. 1 with the required equalisation of the transfer functions of the distortion estimate signal path and the demodulated signal path between the mixer output and the subtraction point. Generally speaking, mismatch will occur between the low-pass filter 24 and the low-pass filter 27, and the worse the mismatch the more taps that are needed in the equaliser. On the other hand, if the transfer function of the two signal paths are identical except for gain then only one tap is required, and this performs the function and operation of the gain scaling circuit 7 of FIG. 1 only.

The LMS algorthim carried out by the adaptive linear combiner 28 proceeds by calculating the value of the direct conversion receiver output signal y by performing the operation:

$$y = s_d - \left( w_{de} + \sum_i x_i w_i \right)$$

The equaliser coefficients are then updated, as represented by:

$w_i = w_i + 2\mu_k y x_i$ and $w_{dc} + 2\mu_{dc} y$

The data is then shifted down the delay elements 29 to 34 and the new input samples taken.

It is to be appreciated that the analogue distortion estimate signal x and the demodulated baseband signal at the output of the low-pass filter 24 are digitised by analogue to digital converters at an analogue to digital interface 54, and that the function of the adaptive linear combiner is carried out using digital signal processing. In other embodiments of the invention, however, the equalisation function can be realised by analog means.

Figure 4:
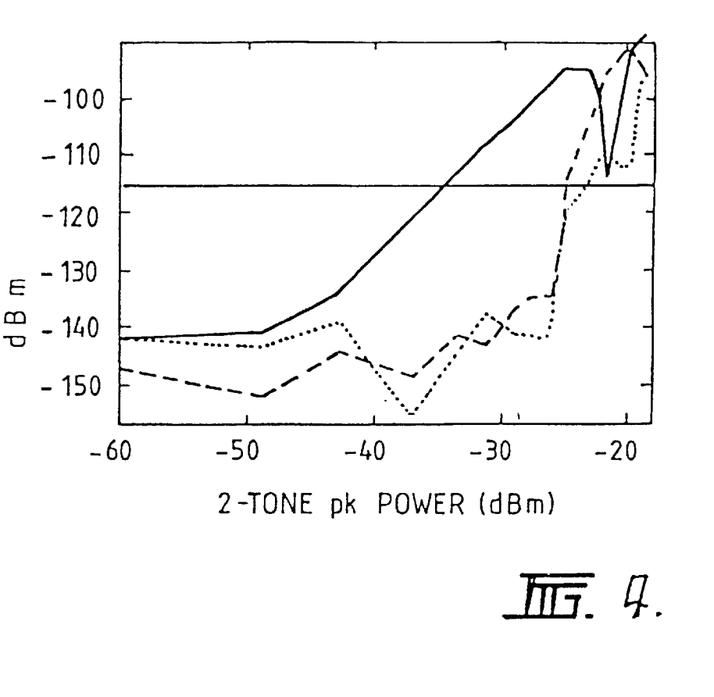
FIGS. 4 and 5 are graphical representations of the intermodulation signal strength referred to the input signal plotted against the interfering signal peak power, of a direct conversion receiver, respectively without and with second order intermodulation distortion correction provided by the distortion correction circuit of the present invention.
Figure 5:
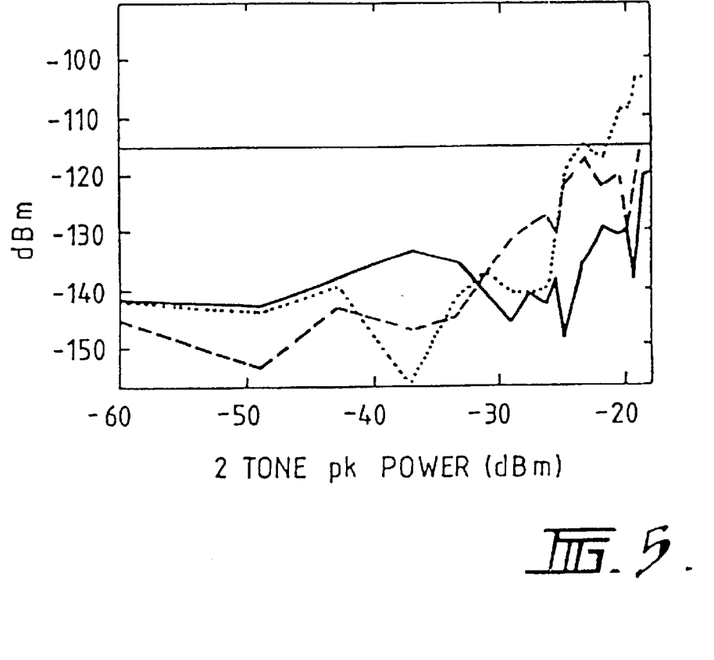

In one experimental realisation of the invention, the two low-pass filters 24 and 27 had cut-off frequencies of 20 kHz, and the DSP sample rate was set to 48 kHz. Samples of the receiver output signal y were stored and then down loaded to a PC for analysis and FFT processing. A Gilbert cell device performed the squaring function. The first test used a two-tone interfering signal for u, 6 MHz away from the desired channel. The tones were separated by 2 kHz to give a beat frequency of 4 kHz. FIG. 4 plots the amplitude of the 4 kHz second order intermodulation (IM2) distortion signal (referred to the input) vs. the peak strength of the two-tone interfering signal. The fourth order intermodulation (IM4) (8 kHz) and sixth order intermodulation (IM6) (12 kHz) terms are also plotted and become dominant when the interference is extremely high (−23 dBm for this device). When the canceller is activated, as seen in FIG. 5, the IM2 signal is cancelled to close to the noise floor. The increase in jamming margin depends on the bandwidth of the desired signal. A DAMPS signal, for example, requires a baseband bandwidth of 15 kHz (RF bandwidth of 30 kHz) and using this experimental set up would generate a noise power of −115.5 dBm (referred to the input). An interference signal of −35 dBm would generate a jamming signal of the same power (−115.5 dB) without canceller (FIG. 3 top) however an interference signal of −23 dBm can be tolerated with a canceller (FIG. 3 bottom); an improvement of 12 db (or 8 dB for the 100 kHz GSM bandwidth). The improvement would be greater for narrower band transmissions, or for receiver front ends with lower noise figures.

Figure 6:
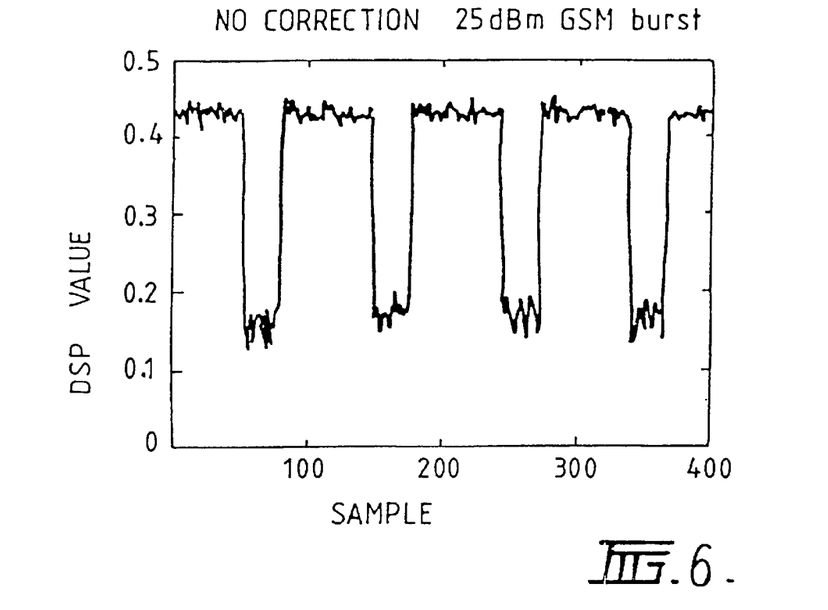
FIGS. 6 to 9 are graphical representations of second order intermodulation distortion generated changes in DC level in a direct conversion receiver caused by a burst of carrier in a TDMA environment.
Figure 7:
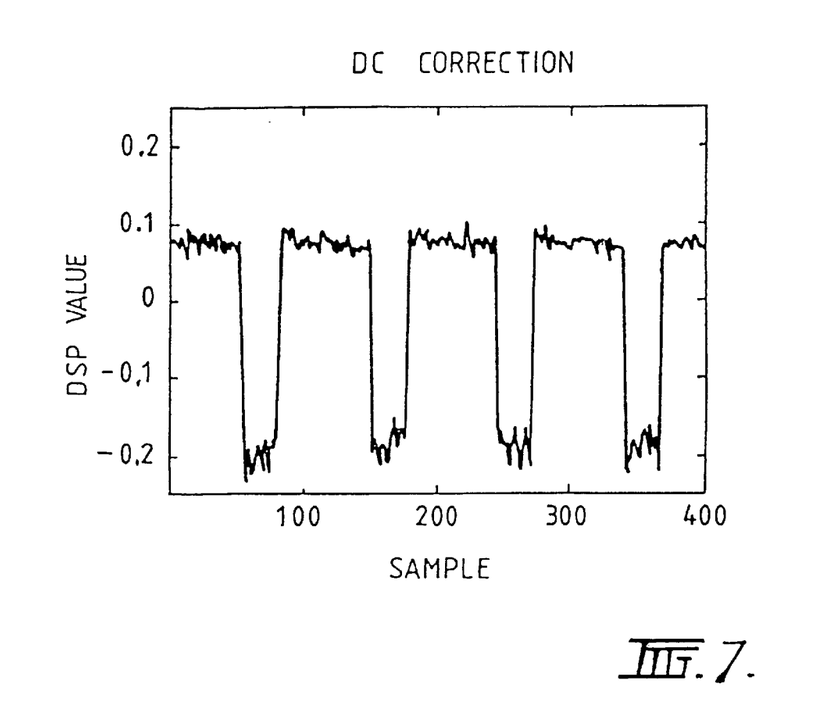
Figure 8:
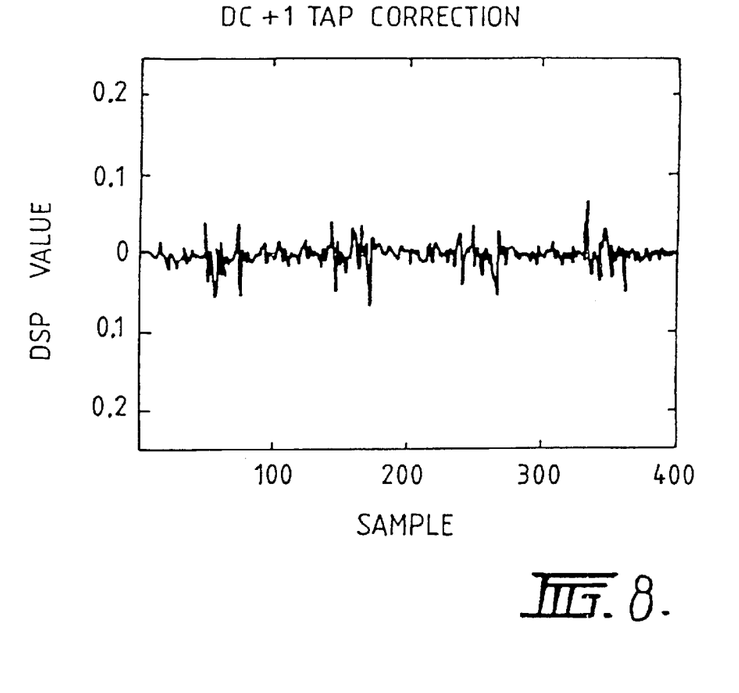
Figure 9:
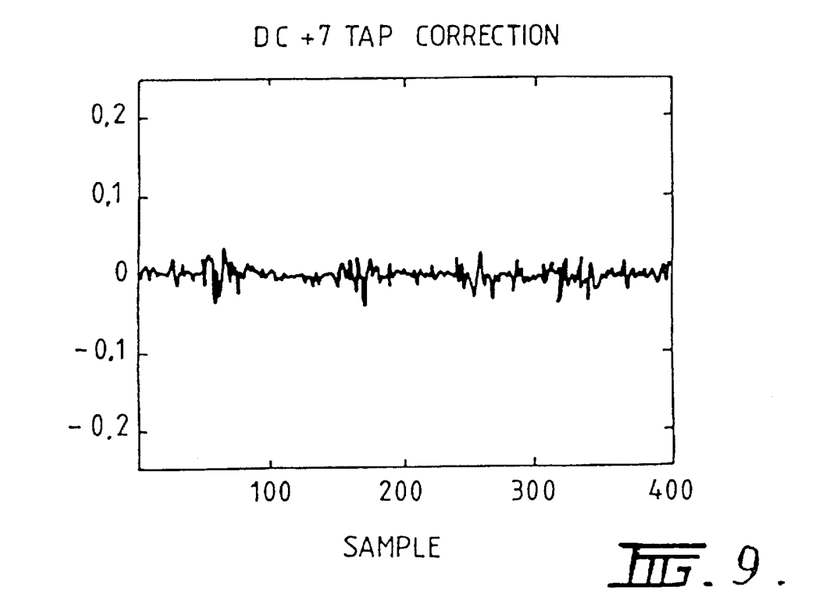

The two-tone interference signal, however, does not test dynamic changes well, since it is easy to set up.the cancellation for a single set frequency. A test signal that produces a higher spectral content in the IM2 signal is desired. The next test conducted mimics the TDMA environment and involves the use of a burst of carrier using the recommended GSM duration, rise and fall times. Waveform plots show the IM2 generated changes in DC level when the burst is present. FIG. 6 shows the waveform at the receiver output signal y (FIG. 2) with no correction; both DC offset and IM2 variations are present. In this system IM2 causes the negative change in the DC level. FIG. 7 shows DC level correction only; still noticeable is the dip in the dc level when the burst is present. FIG. 8 shows DC and IM2 correction, but using only 1 tap. The non-equalised paths cause splashes of distortion whenever the jamming signal has a fast rate of change, such as when the rise and fall times occur. When the 7-tap equaliser is added, these splashes are reduced as shown in FIG. 9, but a slight increase in noise level is still apparent when the carrier burst is present. This appears to be caused by an increase in noise figure from the analogue front-end circuits. As more taps are added the equalisation performance is enhanced but convergence gets slow as the adaptation coefficient $\mu$ must be reduced in line with known LMS theory.

Figure 10:
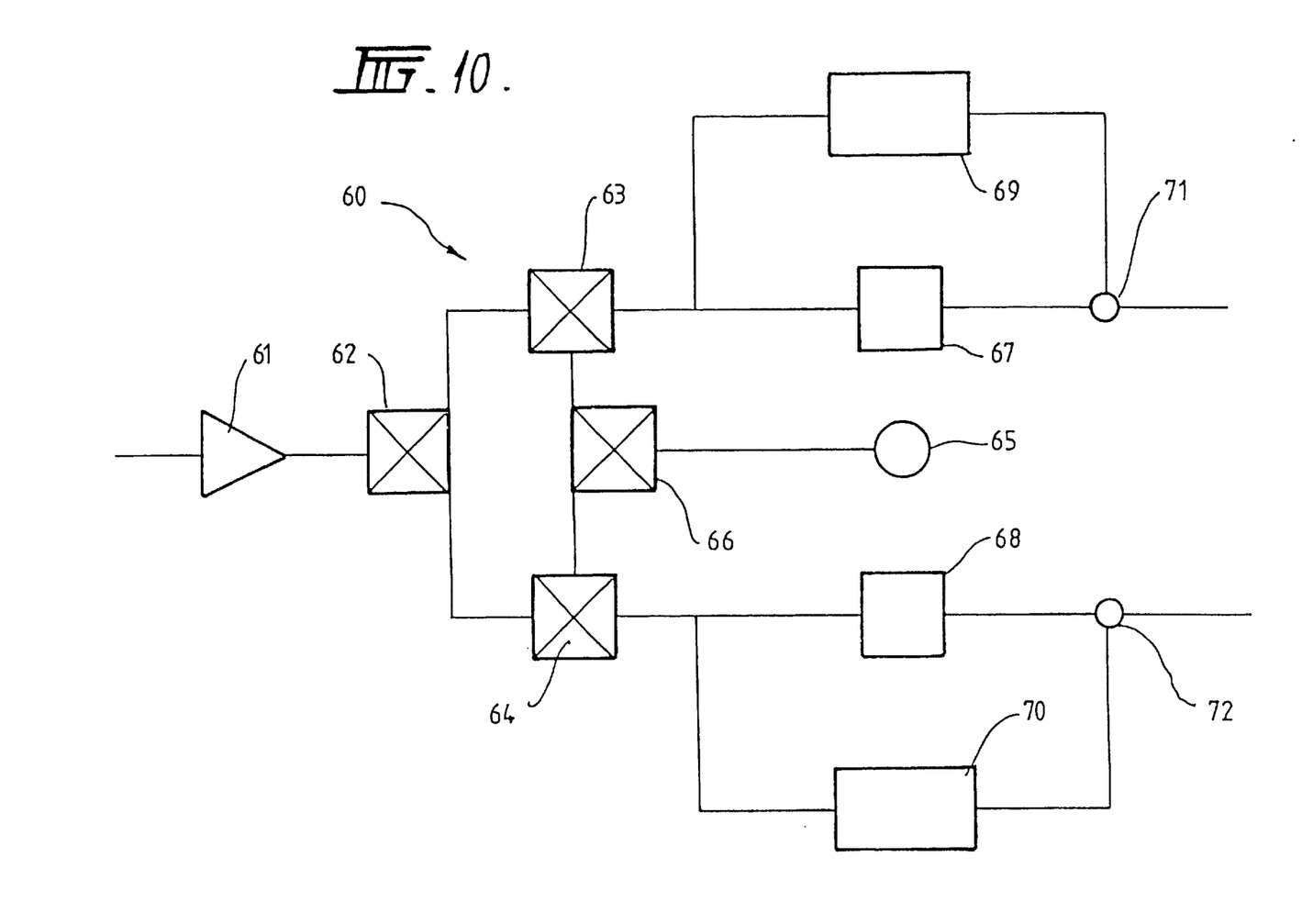
FIG. 10 is a schematic diagram of a receiver using a quadrature demodulator including an offset correction circuit according to the present invention. The receiver may be used for either direct conversion to baseband or conversion to a low intermediate frequency

Turning now to FIG. 10, there is shown a further example of a direct conversion receiver using a distortion correction circuit according to the present invention. The direct conversion receiver 60 comprises an RF amplifier 61 and a signal splitter 62 for generating two copies of the receiver input signal. Each split signal is supplied to mixers 63 and 64. A local oscillator 65 feeds a 90 degrees splitter 66, which in turn supplies each of the mixers 63 and 64 with the local oscillator signal in phase quadrature. In the example illustrated, the output of the mixer 63 defines the quadrature output signal path whilst the output of the mixer 64 defines the in-phase output signal path. Low pass filters 67 and 68 are connected respectively to the output terminals of the mixers 63 and 64. Each arm of the quadrature demodulator shown in FIG. 10 operates in the same manner as the direct conversion receiver 1 of FIG. 1.

Distortion correction circuit 69 is connected between the output of the mixer 63 and a signal subtraction point 71 in the quadrature arm. Similarly, distortion correction circuit 70 is connected between the output of the mixer 64 and a signal subtraction point 72 in the in-phase arm. Both distortion correction circuits 69 and 70 function as previously described.

It can be seen from the foregoing that the present invention provides post distortion cancellation which is effective in improving the distortion performance of direct conversion receivers. The distortion correction circuit of the present invention uses a squaring function to cancel second order intermodulation distortion notably in homodyne receivers, provided the demodulated baseband signal path and the distortion estimate signal path have transfer functions which are equalised for good performance under dynamic conditions.

Finally, it is to be understood that various modifications and/or additions may be made to the offset correction circuit without departing from the ambit of the present invention as defined in the claims appended hereto. For example, whilst the previously described embodiments of the invention act to correct distortion in direct conversion receivers, the invention is also suitable for use in receivers which use low intermediate frequencies where the second order intermodulation distortion signal affects the intermediate frequency signal.

What is claimed is:

1. Distortion correction circuit for a direct conversion receiver, the direct conversion receiver comprising a local oscillator for generating a local oscillator signal, mixer for multiplying a radio frequency signal and a local oscillator signal together and supplying a resultant mixer output signal to a demodulated signal, the demodulated signal path including a first low-pass filter for selecting a baseband signal at a first filter output terminal, wherein the offset correction circuit comprises:

a squaring circuit for squaring the mixer output signal and supplying the resultant distortion estimate signal to a distortion estimate signal path, signal subtraction means for subtracting the distortion estimate signal at a subtraction point in the distortion estimate signal path, and adaptive processing means for equalising the transfer function of the distortion signal estimate path and the transfer function of the demodulated signal path between the mixer output and the subtraction point.

2. Distortion correction circuit according to claim 1, wherein the signal subtraction point is between the mixer and the first low-pass filter.

3. Distortion correction circuit according to claim 1, wherein the distortion estimate signal path further comprises a second low-pass filter, and the signal subtraction point is at the first filter output terminal.

4. Distortion correction circuit according to claim 1, wherein the subtraction of the distortion estimate signal at the subtraction point generates and error signal, the adaptive processing means acting to equalize said transfer functions by minimizing the error signal.

5. Distortion correction circuit according to claim 1, wherein the adaptive processing means is an n-tap adaptive linear combiner.

6. Distortion correction circuit according to claim 5, and further comprising delay means for introducing a delay into the demodulated signal path, prior to the subtraction point.

7. Distortion correction circuit according to claim 5, wherein the adaptive linear combiner includes at least a first weight update coefficient for adjusting the weights of a plurality of said taps.

8. Distortion correction circuit according to claim 7, wherein the adaptive linear combiner further includes a second weight update coefficient for separately adjusting the weight at the DC tap.

9. Distortion correction circuit according to claim 5, wherein the adaptive linear combiner includes a DC tap to minimize a DC offset in the demodulated signal path.

10. Distortion correction circuit according to claim 5, wherein the n-tap adaptive linear combiner implements a least mean squared error algorithm.

11. Distortion correction circuit according to claim 1, wherein the adaptive processing means are implemented by digital signal processing.

* * * * *